(12) United States Patent
Huang et al.

(10) Patent No.: US 8,588,273 B2
(45) Date of Patent: Nov. 19, 2013

(54) COMMUNICATION SYSTEM AND METHOD FOR CANCELLING TIMING DEPENDENCE OF SIGNALS

(75) Inventors: Liang-Wei Huang, Hsinchu (TW); Shieh-Hsing Kuo, Hsinchu (TW); Ta-Chin Tseng, New Taipei (TW); Ting-Fa Yu, Yunlin County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 76 days.

(21) Appl. No.: 13/304,384

(22) Filed: Nov. 24, 2011

(65) Prior Publication Data
US 2012/0134406 A1  May 31, 2012

(30) Foreign Application Priority Data
Nov. 29, 2010 (TW) .................. 99141245 A

(51) Int. Cl.
*H04B 1/00* (2006.01)
(52) U.S. Cl.
USPC .......................................... 375/144

(58) Field of Classification Search
USPC ........................... 370/286, 289; 375/144, 148
See application file for complete search history.

(56) References Cited

U.S. PATENT DOCUMENTS

| 4,896,318 A | * | 1/1990 | Kokubo et al. ............... 370/289 |
| 4,965,786 A | | 10/1990 | Salle |
| 8,130,879 B2 | | 3/2012 | Huang |

FOREIGN PATENT DOCUMENTS

| EP | 1 940 042 A1 | 7/2008 |
| JP | 201068213 | 3/2010 |
| TW | 200843367 | 11/2008 |

* cited by examiner

*Primary Examiner* — Brenda H Pham
(74) *Attorney, Agent, or Firm* — Winston Hsu; Scott Margo

(57) ABSTRACT

In a communication system, a timing-dependence cancelling module is included for cancelling timing-dependence of a transmission signal, so as to render a timing-dependent signal be capable of being utilized on communication systems. Besides, updating an echo cancelling parameter by applying an error difference variable and a data difference variable, or by directly decreasing a step-size coefficient, may also fulfill the purpose of reducing or eliminating timing dependence in a transmission signal of a communication system.

16 Claims, 9 Drawing Sheets

COMMUNICATION SYSTEM AND METHOD FOR CANCELLING TIMING DEPENDENCE OF SIGNALS

BACKGROUND

1. Technical Field

The disclosure discloses a communication system and a method for cancelling timing dependence within signals of the communication system.

2. Description of the Related Art

In a conventional fast Ethernet, since a transmission signal Tx and a receiver signal Rx are transmitted with a pair of transmission lines for a same receiver, the transmission signal Tx and the receiver signal Rx will not interfere with each other. Under the spec of the high definition multimedia interface 1.4, the spec of the above-mentioned fast Ethernet is also utilized so that the interference between the signal will not occur, however, under the limitations of transmission media, the transmission signal Tx and the receiver signal Rx have to be transmitted on a same transmission line.

Since the high definition multimedia interface transmits the transmission signal Tx and the receiver signal Rx with a single transmission line, either the transmitter or the receiver receives signals from each other and certain reflected echoes. When the reflected echoes are getting significant, the signal-to-noise ratio of the communication system is getting higher as well so that the echoes are required to be reduced by additionally using an echo canceller.

A conventional echo canceller updates a set of coefficients by using least mean square (LMS), since a corresponding frequency response is getting convergent with the aid of using least mean square to incur a finite frequency response, which reduces amplitudes of the echoes within the signals. A primary condition of using the echo canceller lies on timing independence between received transmission signals Tx, so that different transmission signals received in consecutive moments will not interfere with each other.

However, when the fast Ethernet utilized the multi-level transmit-3 (MLT-3) protocol in encoding, the timing independence between transmission signals cannot be fulfilled so that the echo canceller cannot be utilized. Signals encoded by the MLT-3 protocol acquire values of −1, 0, and +1. Besides, when there are two consecutive MLT-3 encoded signals acquiring a same value 0, it indicates that two corresponding transmission signals Tx acquire a same value as well. Since probabilities of the MLT-3 encoded signals being 0 and 1 are 50% respectively and independently, the probability that two consecutive transmission signals acquire a same value will be 50% as well so that timing dependence occurs between both the transmission signals. Therefore, while retrieving least mean square by using the echo canceller, the frequency response of echoes cannot be convergent so that amplitudes of the echoes cannot be effectively reduced.

BRIEF SUMMARY

For neutralizing the defect that the frequency response of the echoes cannot be convergent because of the timing dependence between transmission signals, a communication system and a related method for cancelling timing dependence between transmission signals are disclosed in the disclosure.

In an exemplary embodiment, a communication system is disclosed. The communication system comprises a first timing dependence cancellation module, an echo cancellation module, a data path module, and a rear module. The first timing dependence cancellation module is utilized for cancelling timing dependence within a timing-dependent signal, so as to generated an echo integral signal. The echo cancellation module is utilized for generating an echo simulation signal with reference to the echo integral signal. The data path module is utilized for generating a data signal with reference to the timing-dependent signal and a transmission signal received by the data path module. The rear module is utilized for generating a first communication signal with reference to the data signal and the echo simulation signal.

In another exemplary embodiment, a communication system is disclosed. The communication system comprises an echo cancellation module, a data path module, and a rear module. The echo cancellation module is utilized for generating an echo simulation signal with reference to a timing-dependent signal. The data path module comprises a first timing dependence cancellation module. The data path module is utilized for cancelling timing dependence within the timing-dependent signal and a transmission signal received by the data path module, so as to generate a data signal. The rear module is utilized for generating a first communication signal with reference to the data signal and the echo simulation signal.

In another exemplary embodiment, a method for cancelling timing dependence within signals of a communication system is disclosed. The method comprises updating an echo cancellation coefficient utilized by an echo cancellation module of a communication system, with reference to the echo cancellation coefficient, a step-size coefficient, an error variation variable, and a data variation variable, so that the echo cancellation module is configured to cancel timing dependence within a timing-dependent signal with reference to the updated echo cancellation coefficient.

In another exemplary embodiment, a method of cancelling timing dependence within signals of a communication system is disclosed. The method comprises determining whether to update a step-size coefficient utilized by an echo cancellation module of a communication system, with reference to whether a first datum received at a first moment is the same with a second datum received at a second moment, and updating an echo cancellation coefficient utilized by the echo cancellation with reference to the updated step-size coefficient, an error variable, and the second datum. The echo cancellation module is configured to cancel timing dependence within a timing-dependent signal with reference to the echo cancellation coefficient, and an occurring moment of the error variable is the same with both the second datum and the echo cancellation coefficient.

These and other objectives of the disclosure will no doubt become obvious to those of ordinary skill in the art after reading the following detailed description of the embodiment that is illustrated in the various figures and drawings.

DETAILED DESCRIPTION

Different characteristics of the disclosure are described with the accompanying figures, and similar components are labeled with the same notation in the figures. Please note that motion detection apparatuses and related methods disclosed in various embodiments of the disclosure are applicable to many image processing operations such as motion adaptive de-interlacing, motion compensation de-interlacing, Y/C separation, false color suppression, and noise reduction. Additionally, in practice, the term "pixel value" in related descriptions of the disclosure can be utilized for representing pixel luminance, pixel chrominance, or any other value capable of being utilized for motion detection, while the term "pixel position" covers a wide range, and can be utilized for defining a position of an existing pixel or a position of a pixel having a pixel value to be generated through interpolation.

Figure 1:
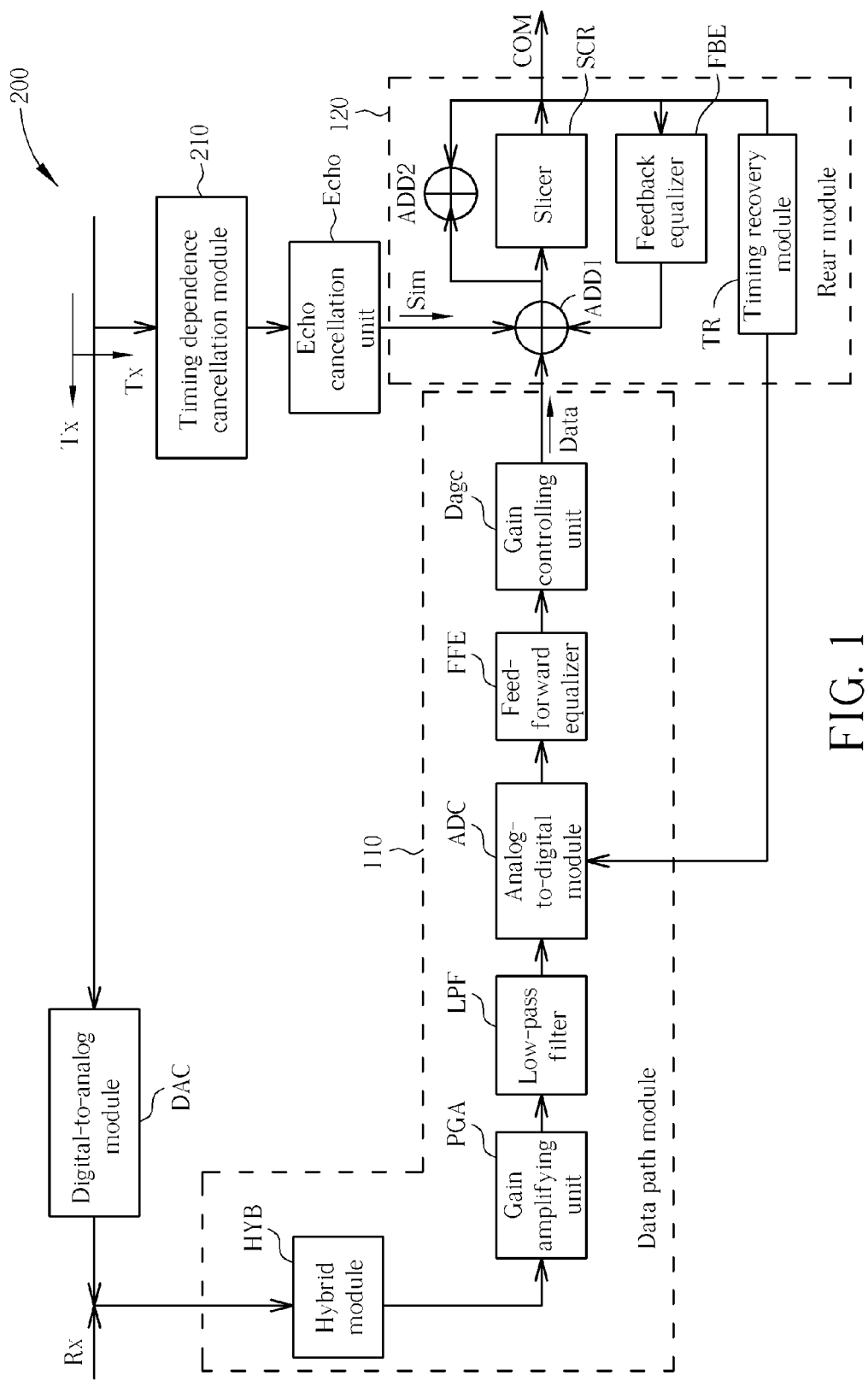
FIG. 1 illustrates a block diagram of a communication system with reference to a first embodiment.

Please refer to FIG. 1, which illustrates a block diagram of a communication system 200 with reference to a first embodiment. As shown in FIG. 1, the communication system 200 includes a first timing dependence cancellation module 210, an echo cancellation module Echo, a data path module 110, and a rear module 120, where timing dependence is introduced in the transmission signal Tx received by the communication system 200.

The first timing dependence cancellation module 110 is utilized for cancelling timing dependence within the transmission signal Tx so as to generate an echo integral signal, and the echo cancellation module Echo is utilized for generating an echo simulation signal Sim with reference to the echo integral signal. The data path module 110 is utilized for generating a data signal Data with reference to both the transmission signal Tx and a receiver signal Rx transmitted from a remote terminal. The rear module 120 is utilized for generating a first communication signal COM with reference to both the data signal Data and the echo simulation signal Sim.

Figure 2:
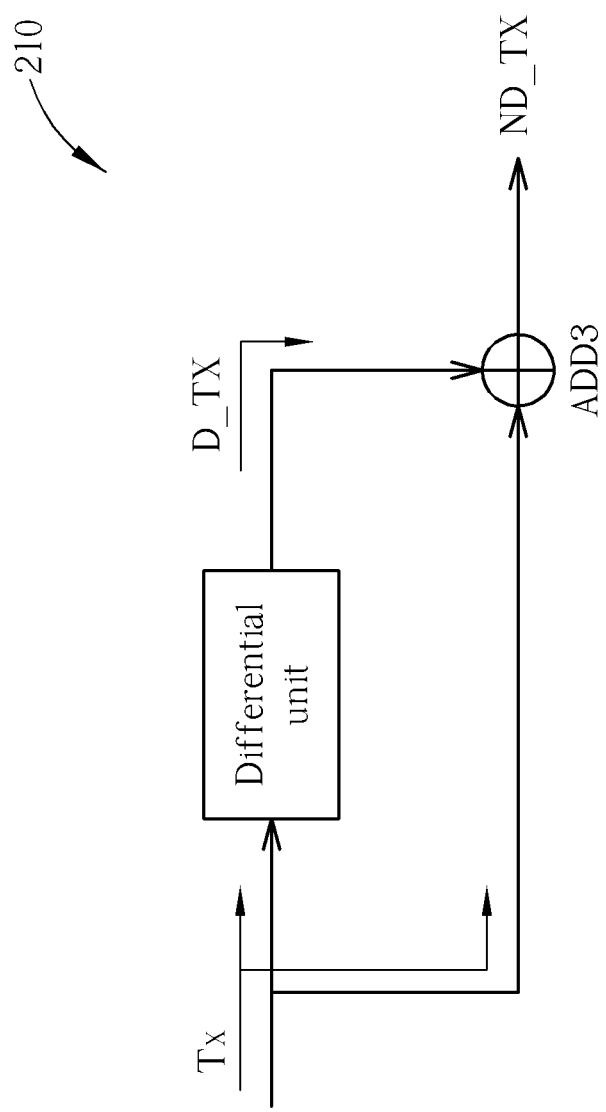
FIG. 2 illustrates a block diagram of the first timing dependence cancellation module shown in FIG. 1.

Please refer to FIG. 2, which illustrates a block diagram of the first timing dependence cancellation module 210 shown in FIG. 1. As shown in FIG. 2, the first timing dependence cancellation module 210 includes a first differential unit Diff and an adder ADD3. The differential unit Diff performs a differential operation on the transmission Tx so as to generate a differential signal D_TX. The adder ADD3 is substantially a subtractor, and is utilized subtracting the differential signal D_TX from the transmission signal TX so as to generate an echo integral signal ND_TX. Note that in considerations of the frequency response, the first timing dependence cancellation module 210 substantially integrates noises within the transmission signals Tx, and cancels the timing dependence between any two consecutive transmission signals Tx with the aid of the adder ADD3. Therefore, the timing dependence has been completely excluded from the generated echo integral signal.

The data path module 110 includes a digital-to-analog module DAC, a hybrid module HYB, a gain amplifying unit PGA, a low-pass filter LPF, an analog-to-digital module ADC, a feed-forward equalizer FFE, and a gain controlling unit Dagc. The digital-to-analog module DAC is utilized for transmitting the transmission signal Tx into an analog signal. The hybrid module HYB is utilized for hybridizing the analog signal with the receiver signal Rx, so as to generate a hybrid signal. The gain amplifying unit PGA is utilized for raising a gain of the hybrid signal so as to generate a first gain signal. The low-pass filter LPF is utilized for generating a first band signal with reference to the first gain signal. The analog-to-digital module ADC is utilized for transforming the first band signal into a digital signal with reference to a timing recovery signal. The feed-forward equalizer FFE is utilized for transforming the digital signal into a first equalizing signal. The gain controlling unit Dagc is utilized for controlling a gain of the first equalizing signal so as to generate the data signal Data.

The rear module 120 includes adders ADD1 and ADD2, a slicer SCR, a feedback equalizer FBE, and a timing recovery module TR. The adder ADD1 is utilized for mixing the data signal Data with the echo simulation signal Sim, so as to generate a second communication signal. The adder ADD2 is utilized for adjusting an amplitude of the second communication signal with the slicer SCR, so as to generate a first communication signal COM. The feedback equalizer FBE is utilized for feedbacking the first communication signal COM to the adder ADD1. The timing recovery module TR is utilized for generating the timing recovery signal with reference to the first communication signal COM, and for outputting the timing recovery signal to the analog-to-digital module ADC.

Besides, when the transmission signal Tx is encoded by suing the MLT-3 protocol, the first communication signal COM shown in FIG. 1 is required to be retrieved by its absolute value, so as to retrieve the communication signal required by the communication system 200. Note the an absolute value module may be further coupled to the slicer SCR so as to retrieve the absolute value of the first communication signal COM, which is regarded to be an output signal of the communication system 200.

With the aid of the first timing dependence cancellation module 210, timing dependence has been excluded from the echo simulation signal Sim. Therefore, besides the echo cancellation module Echo can be kept functional in cancelling echoes, the transmission signal Tx acquiring timing dependence can also be utilized for meeting specifications of the high definition multimedia interface 1.4 without affecting operations of the communication system 200.

Except for disposing the first timing dependence cancellation module 210 in front of the echo cancellation module Echo for cancelling timing dependence of the transmission signal Tx in advance, in other embodiments, the first timing dependence cancellation module 210 may also be disposed within the data path module 110 for cancelling the timing dependence within the data signal Data; besides, after mixing the data signal Data with the echo integral signal with the aid of the adder ADD1, timing dependence will be excluded from the second communication signal as well, i.e., the same effect with the communication system 200 shown in FIG. 1.

Please refer to FIGS. 3-8, which illustrate block diagrams of a communication system 300 with reference to embodiments generated by disposing the first timing dependence cancellation module 210 at different locations within the data path module 110. For preventing from confusion in serial numbers of elements, except for replacing the communication system 200 by the communication system 300 and replacing the data path module 110 with the data path module 320, other elements are kept by the same serial numbers.

Figure 3:
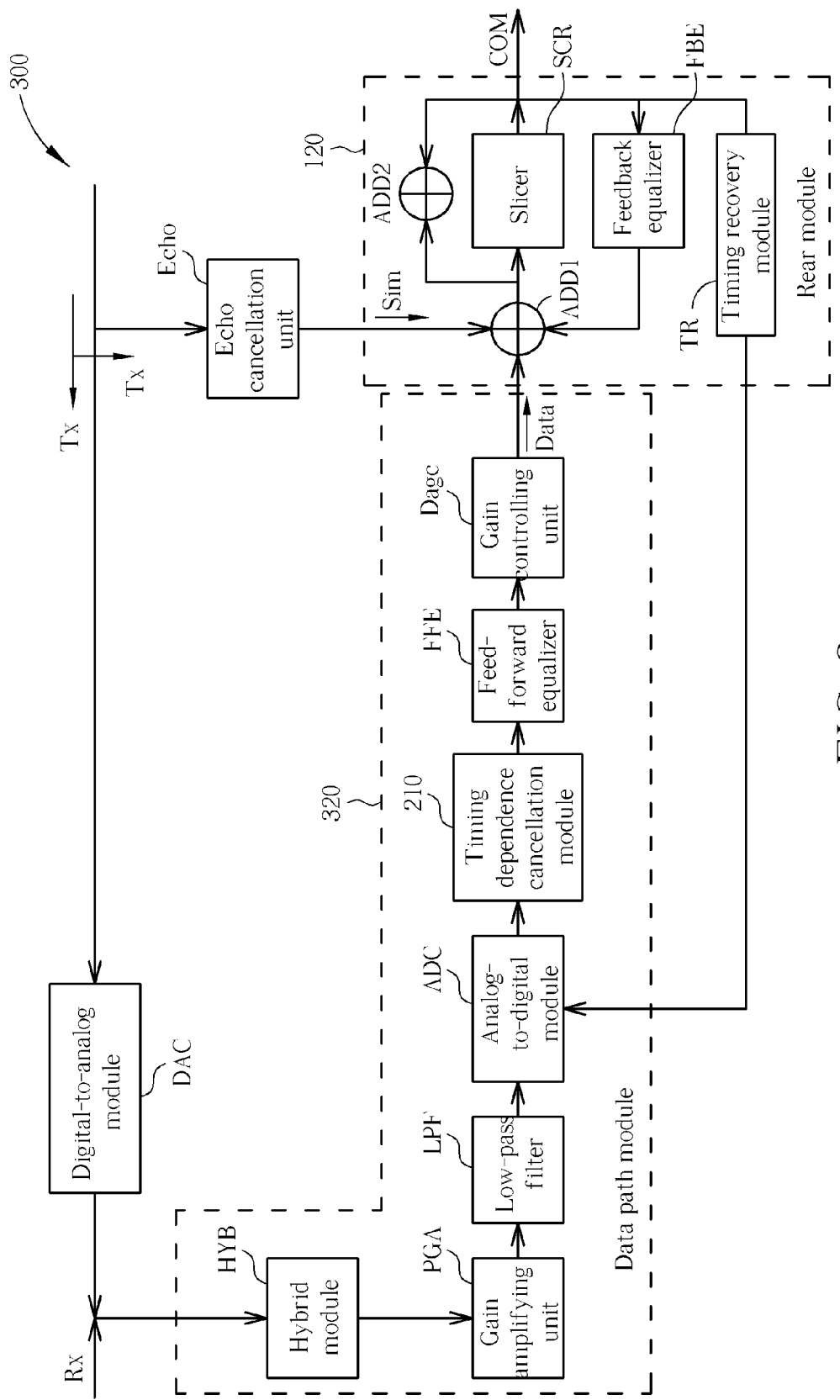
FIGS. 3-8 illustrate block diagrams of a communication system with reference to embodiments generated by disposing the first timing dependence cancellation module at different locations within the data path module.

In FIG. 3, the first timing dependence cancellation module 210 shown in FIG. 1 is changed to be disposed at the output terminal of the analog-to-digital module ADC, and the first timing dependence cancellation module 210 cancels timing dependence within the digital signal so as to generate a non-timing-dependent digital signal.

Figure 4:
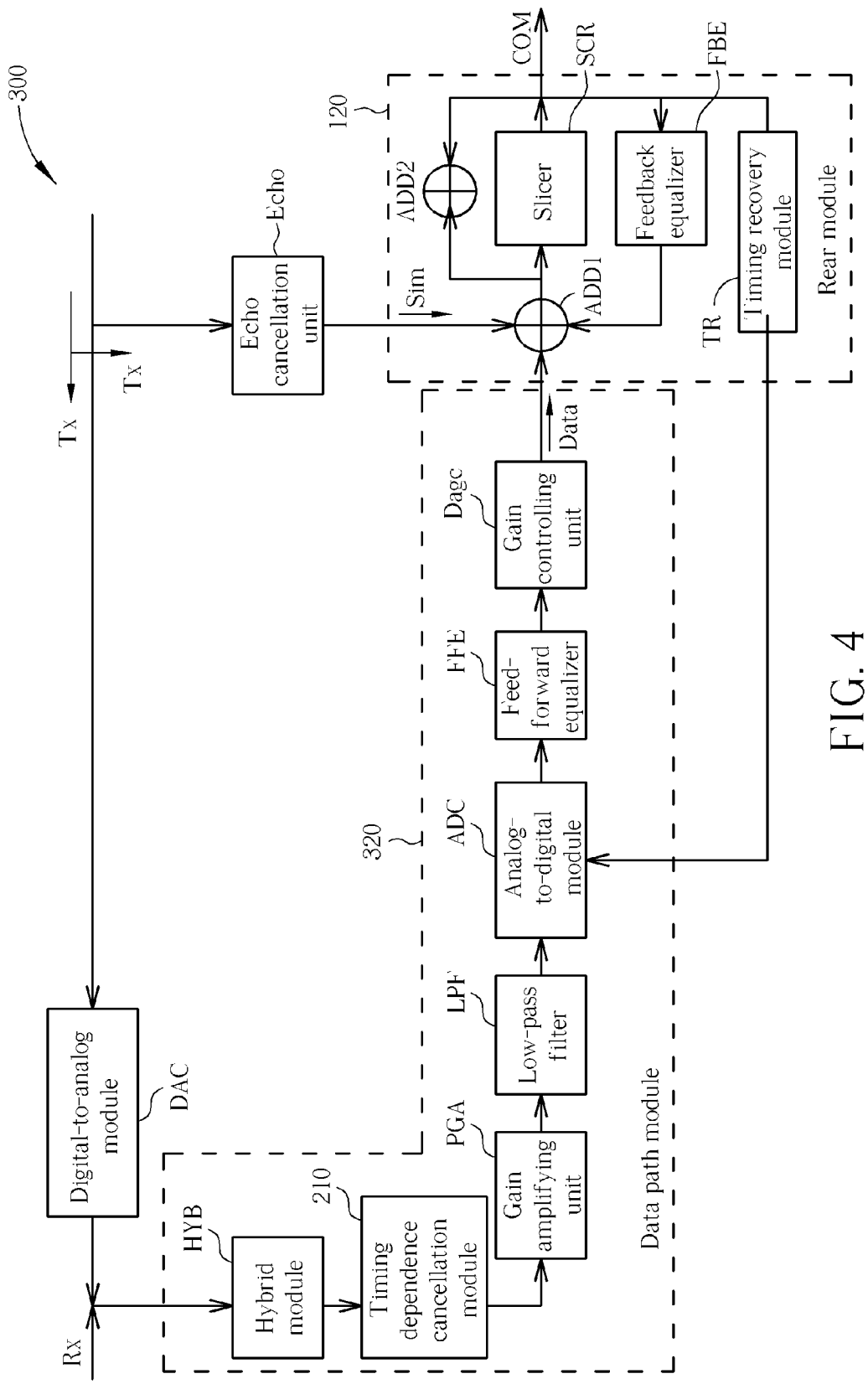

In FIG. 4, the first timing dependence cancellation module 210 shown in FIG. 1 is changed to be disposed at the output terminal of the hybrid module HYB, and the first timing dependence cancellation module 210 is utilized for cancelling timing dependence within the hybrid signal so as to generate a non-timing-dependent hybrid signal.

Figure 5:
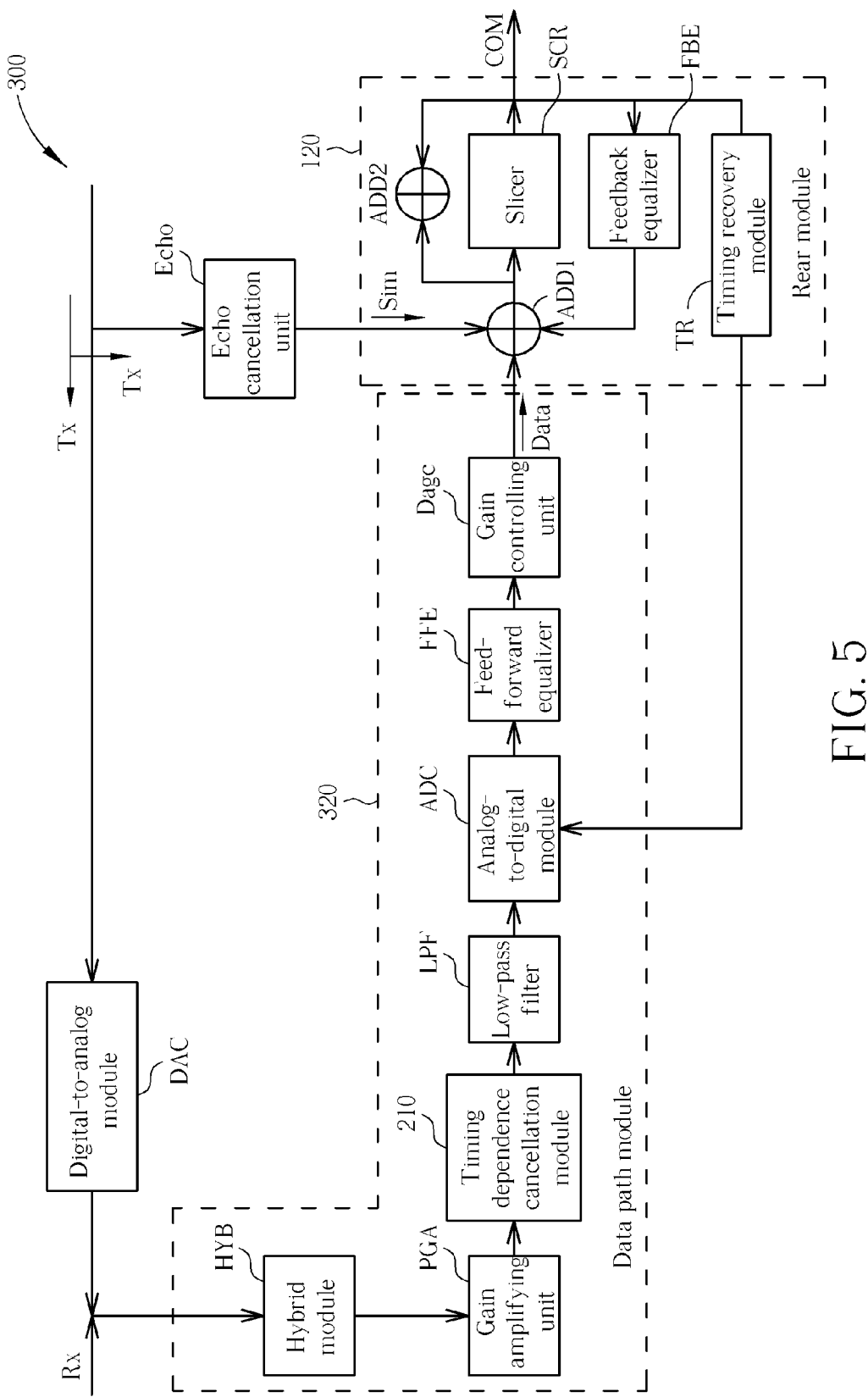

In FIG. 5, the first timing dependence cancellation module 210 shown in FIG. 1 is changed to be disposed at the output terminal of the gain controlling module PGA, and the first timing dependence cancellation module 210 is utilized for cancelling timing dependence within the gain signal so as to generate a non-timing-dependent gain signal.

Figure 6:
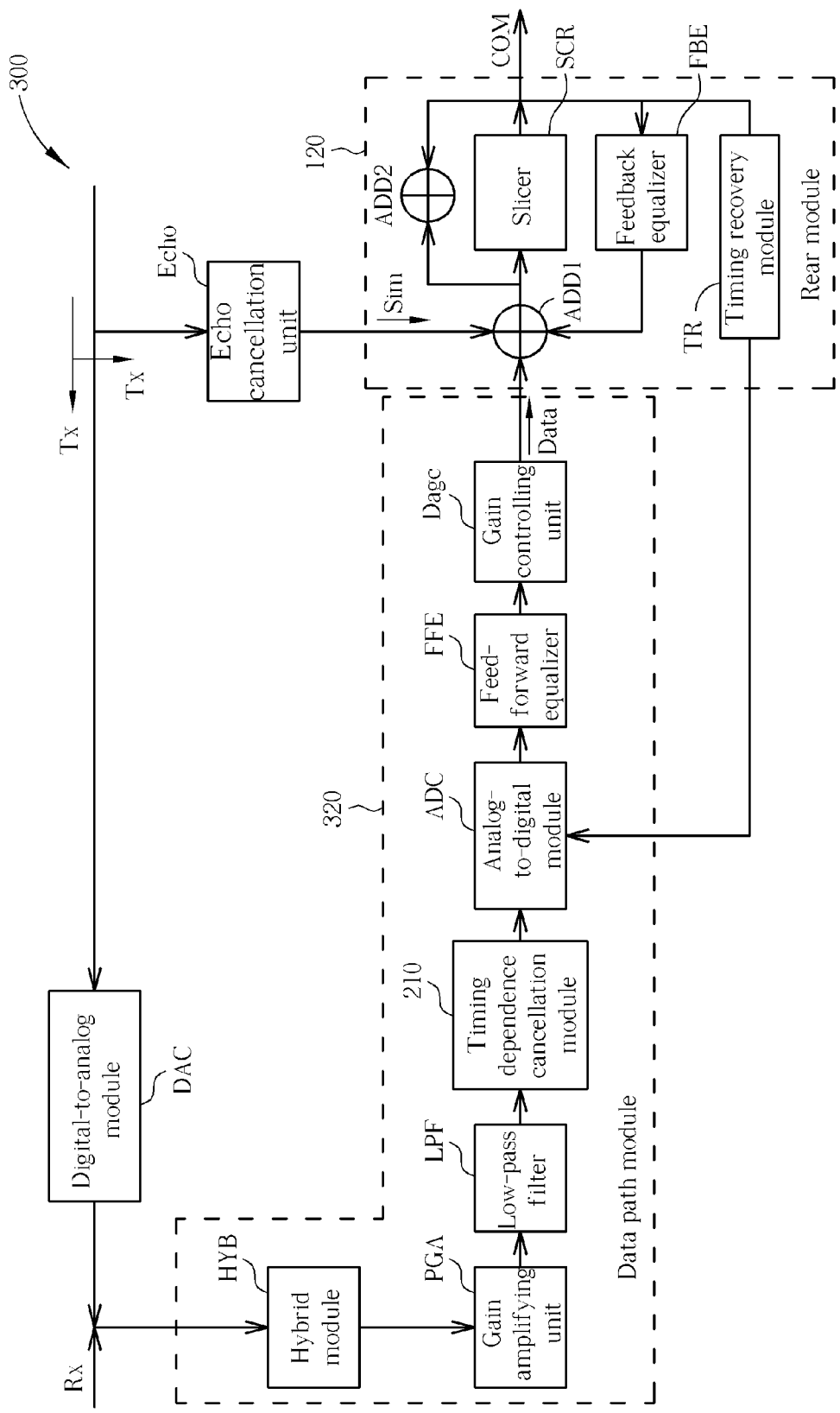

In FIG. 6, the first timing dependence cancellation module 210 shown in FIG. 1 is changed to be disposed at the output terminal of the analog-to-digital module ADC, and the first timing dependence cancellation module 210 is utilized for cancelling timing dependence within the digital signal so as to generate a non-timing-dependent digital signal.

Figure 7:
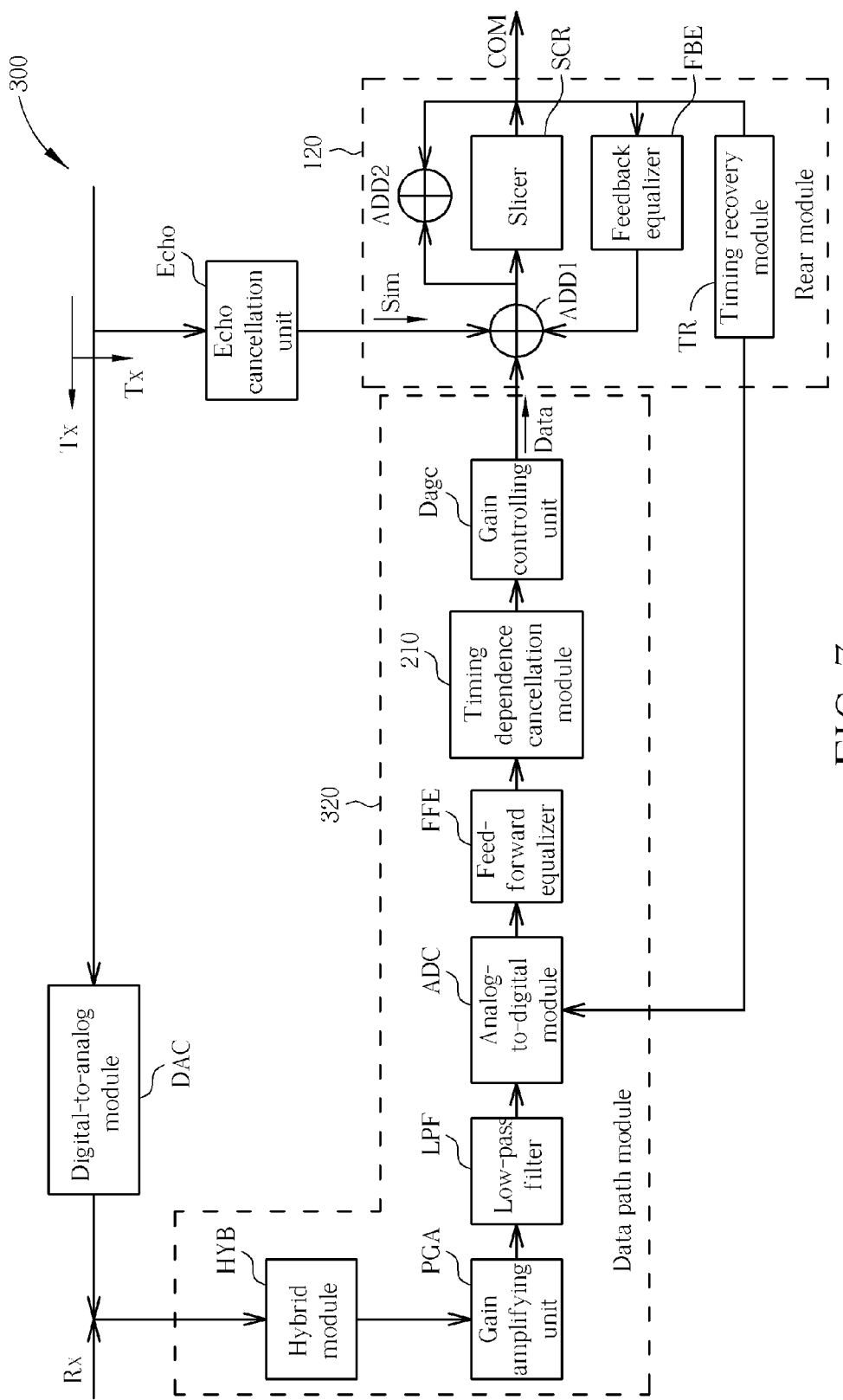

In FIG. 7, the first timing dependence cancellation module 210 shown in FIG. 1 is changed to be disposed at the output terminal of the feed-forward equalizer FFE, and the first timing dependence cancellation module 210 is utilized for cancelling timing dependence within the equalizing signal so as to generate a non-timing-dependent equalizing signal.

Figure 8:
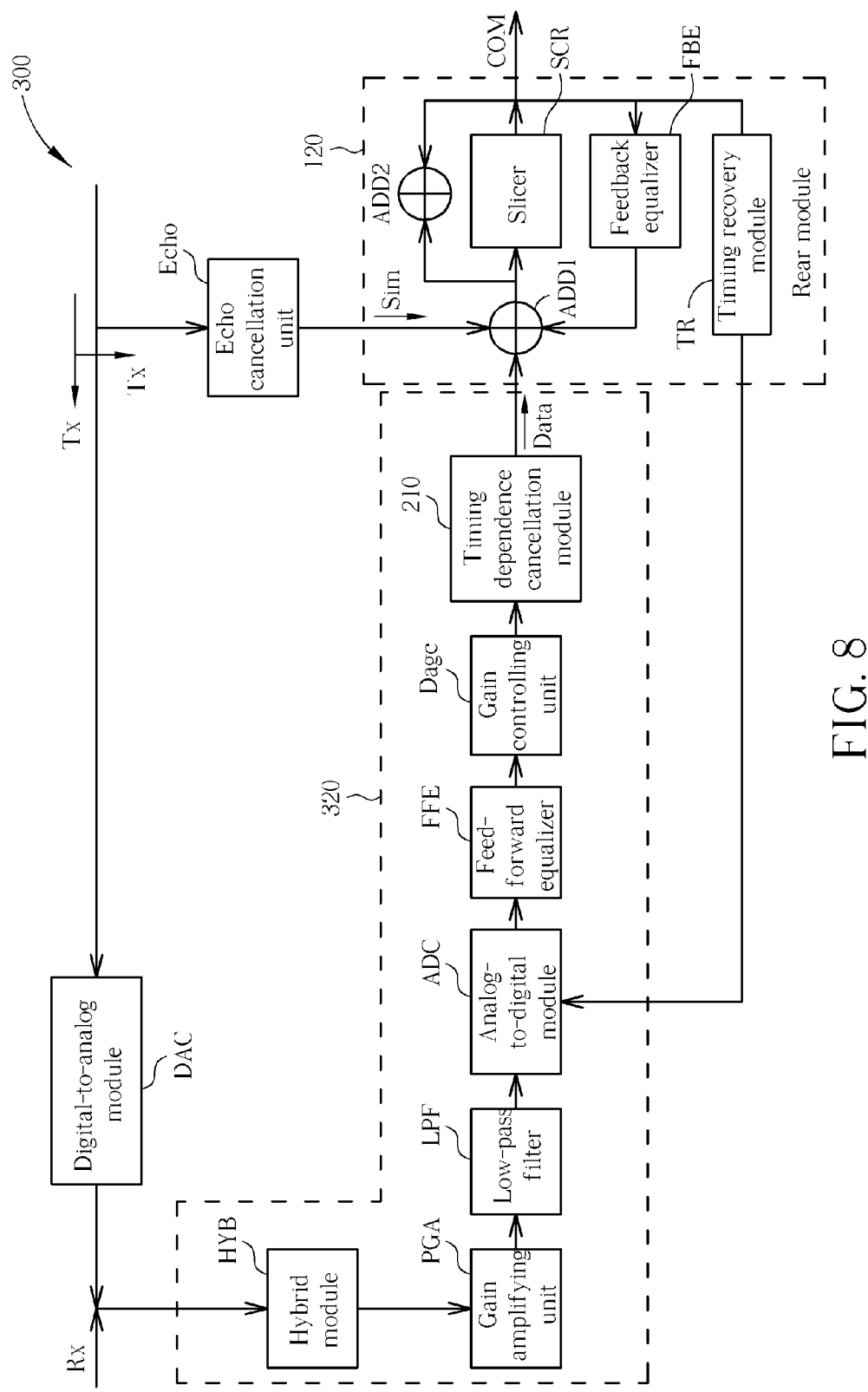

In FIG. 8, the first timing dependence cancellation module 210 shown in FIG. 1 is changed to be disposed at the output terminal of the gain controlling unit Dagc, and the first timing dependence cancellation module 210 is utilized for cancelling timing dependence within a pre-data signal generated by the gain controlling unit Dagc so as to generate the data signal Data.

Figure 9:
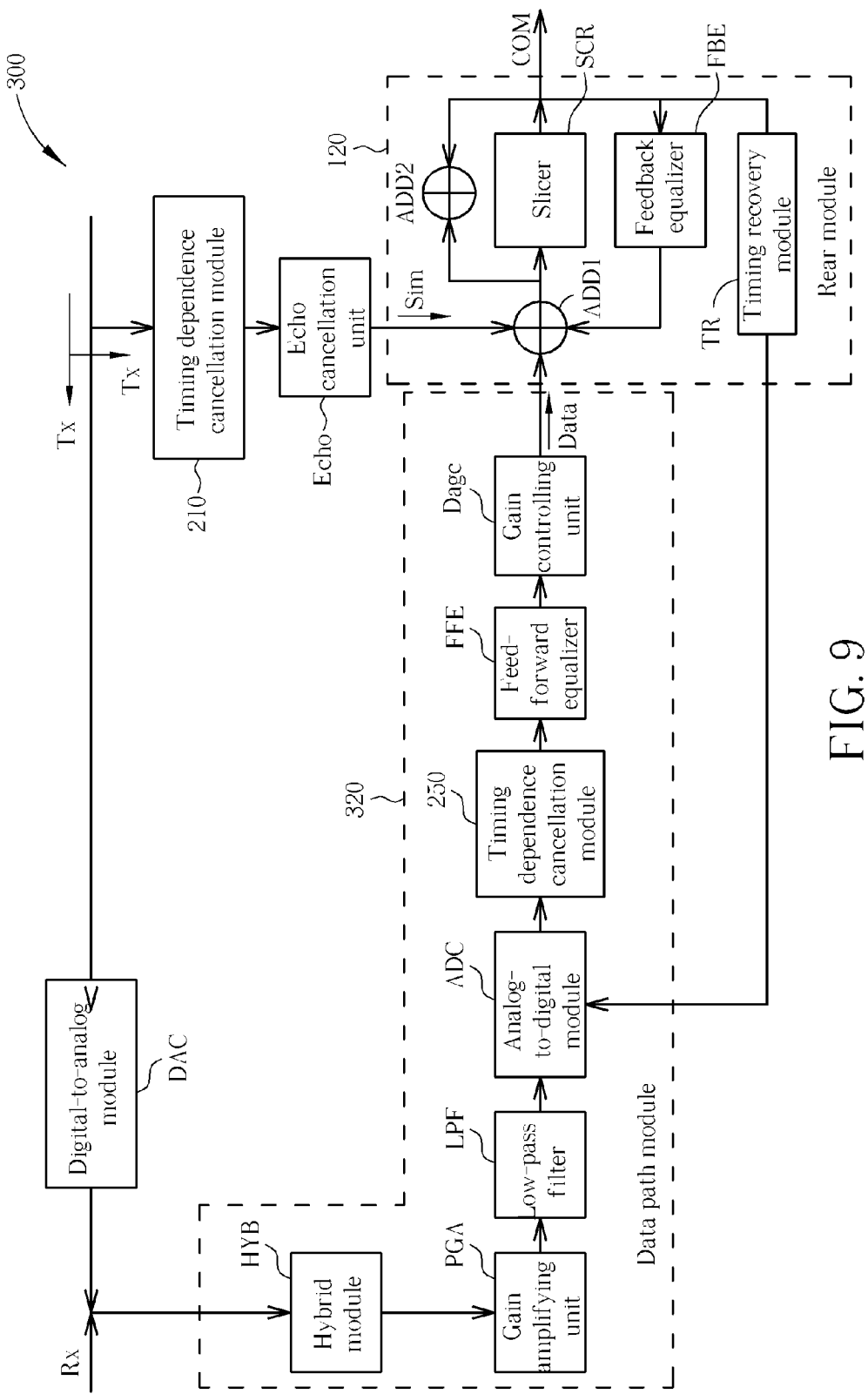
FIG. 9 illustrates a communication system generated by disposing multiple timing dependence cancellation modules within the communication system with reference to one embodiment of the disclosure.

Moreover, multiple timing dependence cancellation modules may also be utilized within the communication systems 200 and 300 in other embodiments for substantially cancelling timing dependence within signals of the communication systems 200 and 300. Please refer to FIG. 9, which illustrates a communication system 400 generated by disposing multiple timing dependence cancellation modules within the communication system 200 or 300 with reference to one embodiment. As shown in FIG. 9, besides the first timing dependence cancellation module 210 disposed at the input terminal of the echo cancellation module 210, there is also a second time dependence cancellation module 250 disposed inside the data path module 320, where components and structure of both the time dependence cancellation modules 210 and 250 are the same. Moreover, embodiments generated by disposing the second timing dependence cancellation module 250 shown in FIG. 9 in different locations, as the locations shown in FIGS. 3-8, should also be regarded as embodiments.

In the disclosure, besides cancelling the timing dependence within signals by using the timing dependence cancellation module shown in FIG. 2, a method is further disclosed for directly cancelling timing dependence within the echo cancellation module Echo. A conventional method by retrieving least mean square on signals is utilized for reducing echoes. The conventional method is indicated as follows:

$$COE\_NEW = COE\_OLD + u*ERROR*DATA \quad (1)$$

COE_NEW indicates an updated echo cancellation coefficient utilized in the echo cancellation module Echo for cancelling echoes. COE_OLD indicates an un-updated echo cancellation coefficient. ERROR indicates an error variable, u indicates a step-size coefficient, and DATA indicates a datum carried by the transmission signal Tx. However, timing dependence occurs in the data signal DATA indicated in the equation (1).

Therefore, for cancelling the timing dependence introduced in the equation (1), an equation (2) is disclosed in the disclosure as follows:

$$COE\_NEW = COE\_OLD + u*(ERROR\_NOW - ERROR\_OLD)*(DATA\_NEW - DATA\_OLD)$$

ERROR_OLD indicates a first error occurring at a first moment. ERROR_NOW indicates a second error occurring at a second moment, where the first moment is earlier than the second moment. DATA_OLD indicates a first datum carried by the transmission signal Tx at the first moment. DATA_NEW indicates a second datum carried by the transmission signal Tx at the second moment. The updated echo cancellation coefficient COE_NEW occurs at the second moment, and the un-updated echo cancellation coefficient COE_OLD occurs at the first moment. By retrieving an error variation variable (ERROR_NOW−ERROR_OLD) and a data variation variable (DATA_NEW−DATA_OLD), the cancellation of timing dependence within signals may also be fulfilled.

Besides cancelling timing dependence within signals with the aid of the equation (2), in another embodiment, the step-size u shown in the equation (1) may also be adjusted to cancel the timing dependence. As mentioned before, when encoding signals by using the MLT-3 protocol, the timing dependence is introduced by same contents of two consecutive transmission signals under a certain probability. For handling such a situation, the step-size coefficient u is reduced for converging the influence of the first datum on the second datum, i.e., reducing the effect of the un-updated echo cancellation coefficient COE_OLD on the updated echo cancellation coefficient COE_NEW for restricting the timing dependence between consecutive transmission signals. Moreover, in one embodiment, the step-size coefficient u is adjusted to be zero, so that the echo cancellation coefficient COE_OLD will not be updated, i.e., the second datum is entirely prevented from being affected by the first datum.

The disclosure discloses a communication system and a related method for cancelling timing dependence within transmission signal. With the aid of both the communication system and the method, amplitudes of echoes within the communication system will be convergent without affecting performance of the communication system, when the communication system is utilized for timing-dependent transmission signals, such as signals encoded by the MLT-3 protocol.

Those skilled in the art will readily observe that numerous modifications and alterations of the device and method may be made while retaining the teachings of the disclosure.

What is claimed is:

1. A communication system, comprising:
   a first timing dependence cancellation module, for cancelling timing dependence within a timing-dependent signal, so as to generated an echo integral signal;
   an echo cancellation module, for generating an echo simulation signal with reference to the echo integral signal;
   a data path module, for generating a data signal with reference to the timing-dependent signal and a transmission signal received by the data path module; and
   a rear module, for generating a first communication signal with reference to the data signal and the echo simulation signal.

2. The communication system of claim 1, wherein the first timing dependence cancellation module comprises:
   a differential unit, for transforming the timing-dependent signal into a differential signal; and a first adder, for mixing the differential signal with the timing-dependent signal, so as to generate the echo integral signal.

3. The communication system of claim 1 wherein the data path module includes
   a digital-to-analog module, for transforming the timing-dependent signal into an analog signal;
   a hybrid module, for hybridizing the analog signal with the transmission signal, so as to generate a hybrid signal;
   a gain amplifying unit, for raising a gain of the hybrid signal so as to generate a first gain signal;
   a low-pass filter, for generating a first band signal with reference to the first gain signal;
   an analog-to-digital module, for transforming the first band signal into a digital signal with reference to a timing recovery signal;
   a feed-forward equalizer, for transforming the digital signal into a first equalizing signal; and
   a gain controlling unit, for controlling a gain of the first equaling signal so as to generate the data signal;
   wherein the rear module comprises:
      a second adder, for mixing the data signal with the echo simulation signal, so as to generate a second communication signal;
      a slicer;
      a third adder, for adjusting an amplitude of the second communication signal with the slicer, so as to generate the first communication signal;
      a feedback equalizer, for feedbacking the first communication signal to the second adder; and
      a timing recovery module, for generating the timing recovery signal with reference to the first communication signal, and for outputting the timing recovery signal to the analog-to-digital signal.

4. The communication system of claim 3, wherein the rear module further comprises an absolute value module, for retrieving an absolute value of the second communication signal so as to generate a third communication signal.

5. The communication system of claim 4 wherein the timing-dependent signal is utilized for encoding by using multi-level transmit-3 (MLT-3) encoded signals.

6. The communication system of claim 1 wherein the data path module comprises a second timing dependence cancellation module, for cancelling timing dependence within the timing-dependent signal and the transmission signal.

7. A communication system, comprising:
   an echo cancellation module, for generating an echo simulation signal with reference to a timing-dependent signal;
   a data path module comprising a first timing dependence cancellation module, the data path module being utilized for cancelling timing dependence within the timing-dependent signal and a transmission signal received by the data path module, so as to generate a data signal; and
   a rear module, for generating a first communication signal with reference to the data signal and the echo simulation signal.

8. The communication system of claim 7, wherein the data path module further comprises:
   a digital-to-analog module, for transforming the timing-dependent signal into an analog signal;
   a hybrid module, for hybridizing the analog signal with the transmission signal, so as to generate a hybrid signal, wherein the first timing dependence cancellation module is utilized for cancelling timing dependence within the hybrid signal so as to generate a non-timing-dependent hybrid signal;
   a gain amplifying unit, for raising a gain of the non-timing-dependent hybrid signal, so as to generate a first gain signal;
   a low-pass filter for generating a first band signal with reference to the first gain signal;
   an analog-to-digital module for transforming the first band signal into a digital signal with reference to a timing recovery signal;
   a feed-forward equalizer, for transforming the digital signal into a first equalizing signal; and
   a gain controlling unit, for controlling a gain of the first equalizing signal so as to generate the data signal;
   wherein the rear module comprises:
      a first adder, for mixing the data signal with the echo simulation signal, so as to generate a second communication signal;
      a slicer;
      a second adder, for adjusting an amplitude of the second communication signal with the slicer, so as to generate the first communication signal;
      a feedback equalizer, for feedbacking the first communication signal to the first adder; and
      a timing recovery module, for generating the timing recovery signal with reference to the first communication signal, and for outputting the timing recovery signal to the analog-to-digital module.

9. The communication system of claim 7, wherein the data path module further comprises:
   a digital-to-analog module, for transforming the timing-dependent signal into an analog signal;
   a hybrid module, for hybridizing the analog signal with the transmission signal so as to generate a hybrid signal;
   a gain amplifying unit, for raising a gain of a non-timing-dependent hybrid signal, so as to generate a first gain signal, wherein the first timing dependence cancellation module is utilized for cancelling timing dependence within the first gain signal, for generating an non-timing dependent gain signal;
   a low-pass filter, for generating a first band signal with reference to the non-timing dependent gain signal;
   an analog-to-digital module, for transforming the first band signal into a digital signal with reference to a timing recovery signal;
   a feed-forward equalizer, for transforming the digital signal into a first equalizing signal; and
   a gain controlling unit, for controlling a gain of the first equalizing signal so as to generate the data signal;
   wherein the rear module comprises:
      a first adder, for mixing the data signal with the echo simulation signal, so as to generate a second communication signal;
      a slicer;
      a second adder, for adjusting an amplitude of the second communication signal with the slicer, so as to generate the first communication signal;
      a feedback equalizer, for feedbacking the first communication signal to the first adder; and
      a timing recovery module, for generating the timing recovery signal with reference to the first communication signal, and for outputting the timing recovery signal to the analog-to-digital module.

10. The communication system of claim 7, wherein the data path module further comprises:
    a digital-to-analog module, for transforming the timing-dependent signal into an analog signal;
    a hybrid module, for hybridizing the analog signal with the transmission signal, so as to generate a hybrid signal;

a gain amplifying unit, for raising a gain of the hybrid signal, so as to generate a first gain signal;
a low-pass filter, for cancelling timing dependence within the first gain signal, so as to generate a first band signal, wherein the first timing dependence cancellation module is utilized for cancelling timing dependence within the first band signal, so as to generate a non-timing-dependent band signal;
an analog-to-digital module, for transforming the non-timing dependent band signal into a digital signal;
a feed-forward equalizer, for transforming the digital signal into a first equalizing signal; and
a gain controlling unit, for controlling a gain of the first equalizing signal so as to generate the data signal;
wherein the rear module comprises:
    a first adder for mixing the data signal and the echo simulation signal for cancelling echoes within the data signal, so as to generate a second communication signal;
    a slicer;
    a second adder, for adjusting an amplitude of the second communication signal with the slicer, so as to generate the first communication signal;
    a feedback equalizer, for feedbacking the first communication signal to the first adder; and
    a timing recovery module, for generating the timing recovery signal, and for outputting the timing recovery signal to the analog-to-digital module.

11. The communication system of claim 7, wherein the data path module further comprises:
a digital-to-analog module for transforming the timing-dependent signal into an analog signal;
a hybrid module, for hybridizing the analog signal with the transmission signal, so as to generate a hybrid signal;
a gain amplifying unit, for raising a gain of the hybrid signal, so as to generate a first gain signal;
a low-pass filter, for generating a first band signal with reference to the first gain signal;
an analog-to-digital module, for transforming the first band signal into a digital signal with reference to a timing-recovery signal, wherein the first timing dependence cancellation module is utilized for cancelling timing dependence within the digital signal, so as to generate a non-timing dependent digital signal;
a feed-forward equalizer, for transforming the non-timing dependent digital signal into a first equalizing signal; and
a gain controlling unit, for controlling a gain of the first equalizing signal so as to generate the data signal;
wherein the rear module comprises:
    a first adder, for mixing the data signal and the echo simulation signal for cancelling echoes within the data signal, so as to generate a second communication signal;
    a slicer;
    a second adder, for adjusting an amplitude of the second communication signal with the slicer, so as to generate the first communication signal;
    a feedback equalizer, for feedbacking the first communication signal to the first adder; and
    a timing recovery module, for generating the timing recovery signal with reference to the first communication signal, and for outputting the timing recovery signal to the analog-to-digital module.

12. The communication system of claim 7 wherein the data path module further comprises:
a digital-to-analog module, for transforming the timing-dependent signal into an analog signal;
a hybrid module, for hybridizing the analog signal with the transmission signal, so as to generate a hybrid signal;
a gain amplifying unit, for raising a gain of the hybrid signal, so as to generate a first gain signal;
a low-pass filter, for generating a first band signal with reference to the first gain signal;
an analog-to-digital module, for transforming the first band signal into a digital signal;
a feed-forward equalizer, for transforming the digital signal into a first equalizing signal, wherein the first timing dependence cancellation module is utilized for cancelling timing dependence within the first equalizing signal, so as to generate a non-timing dependent equalizing signal; and
a gain controlling unit, for controlling a gain of the non-timing-dependent equalizing signal so as to generate the data signal;
wherein the rear module comprises:
    a first adder, for mixing the data signal with the echo simulation signal for cancelling echoes within the data signal, so as to generate a second communication signal;
    a slicer;
    a second adder, for adjusting an amplitude of the second communication signal with the slicer, so as to generate the first communication signal;
    a feedback equalizer, for feedbacking the first communication signal to the first adder; and
    a timing recovery module, for generating the timing recovery signal with reference to the first communication signal, and for outputting the timing recovery signal to the analog-to-digital module.

13. The communication system of claim 7, wherein the data path module further comprises:
a digital-to-analog module, for transforming the timing-dependent signal into an analog signal;
a hybrid module, for hybridizing the analog signal with the transmission signal, so as to generate a hybrid signal;
a gain amplifying unit, for raising a gain of the hybrid signal, so as to generate a first gain signal;
a low-pass filter, for generating a first band signal with reference to the first gain signal;
an analog-to-digital module, for transforming the first band signal into a digital signal with reference to a timing recovery signal;
a feed-forward equalizer, for transforming the digital signal into a first equalizing signal; and
a gain controlling unit, for controlling a gain of the first equalizing signal, so as to generate an advance data signal, wherein the first timing dependence module is utilized for cancelling timing dependence within the forward data signal, so as to generate a data signal;
wherein the rear module comprises:
    a second adder, for mixing the data signal with the echo simulation signal for cancelling echoes within the data signal, so as to generate a second communication signal;
    a slicer;
    a third adder, for adjusting an amplitude of the second communication signal with the slicer, so as to generate the first communication signal;
    a feedback equalizer, for feedbacking the first communication signal to the second adder; and a timing recovery module, for generating the timing recovery signal with reference to the first communication signal, and for outputting the timing recovery signal to the analog-to-digital module.

14. The communication system of claim 7, wherein the first timing dependence cancellation module comprises:
   a differential unit, for generating a differential signal with reference to the timing-dependent signal; and
   a third adder, for generating the data signal with reference to the differential signal and the timing-dependent signal.

15. The communication system of claim 7, wherein the rear module comprises an absolute module, for performing absolute value calculations on a hybrid signal of both the data signal and the echo simulation signal, so as to generate the first communication signal.

16. The communication system of claim 15, wherein the timing-dependent signal is utilized for encoding with reference to the multi-level transmit-3 (MLT-3) protocol.

* * * * *